US005459494A

United States Patent [19]

Kajikawa

[11] Patent Number: 5,459,494

[45] Date of Patent: Oct. 17, 1995

[54] AUTOMATIC LEAD SUPPLYING DEVICE FOR A PLOTTER

[75] Inventor: Osamu Kajikawa, Tokyo, Japan

[73] Assignee: Mutoh Industries Ltd., Tokyo, Japan

[21] Appl. No.: 974,105

[22] Filed: Nov. 10, 1992

[30] Foreign Application Priority Data

Nov. 26, 1991 [JP] Japan .................................. 3-336170

[51] Int. Cl.[6] ............................ B43L 13/00; B65G 65/00

[52] U.S. Cl. ........................ 346/139 R; 33/18.2; 221/120

[58] Field of Search ........................... 346/139 C, 139 R; 33/18.1, 18.2; 400/185, 187; 221/120, 119, 132

[56] References Cited

U.S. PATENT DOCUMENTS

| | | | |
|---|---|---|---|
| 4,991,300 | 2/1991 | Takahashi | 346/139 C X |
| 5,092,734 | 3/1992 | Sakoda et al. | 221/132 X |
| 5,179,393 | 1/1993 | Takahashi | 346/139 R |

*Primary Examiner*—Benjamin R. Fuller
*Assistant Examiner*—David Yockey
*Attorney, Agent, or Firm*—Sughrue, Mion, Zinn, Macpeak & Seas; Richard C. Turner; Paul F. Neils

[57] ABSTRACT

A swivelling unit 18 is swivellably supported on the machine body of the plotter between the two predetermined positions. A loader shaft 38 is journalled on the swivelling unit 18 which is interlocked with a rotary drive device. When the swivelling unit 18 moves to the predetermined lead supplying position, a lead tank stocker 44, having a number of lead tanks on its circumference and connected to the loader shaft 38, moves interlockingly with the swivelling unit 18 in the condition of holding the predetermined rotary angle. The lead tank 48 moves immediately above the pencil holder 10 of the writing instruments stocker 8 by this movement. When the opener 76 is driven to this position and the shutter mechanism of the lead tank 48 opens, a piece of the writing lead drops from the lead tank 48 and the writing lead is supplied to the empty pencil holder 12 which is retained by the writing instruments stocker 8. Since the lead tank stocker 46 is rotatable relative to the swivelling unit 18, the lead tank 48, storing the desired kind of writing lead, can be rotated to the lead supplying position from the number of lead tanks 48. Accordingly, the desired lead tank 48 is chosen, and the selected lead tank 48 moves immediately above the desired pencil holder 10 of the writing instruments stocker 8 and the lead is supplied to the pencil holder 10.

2 Claims, 7 Drawing Sheets

AUTOMATIC LEAD SUPPLYING DEVICE FOR A PLOTTER

BACKGROUND OF THE INVENTION

1. Field of the Invention

This invention relates to an automatic lead supplying device for a plotter.

In the Japanese Patent gazette Laid-Open Publication No. Hei 2-305669, a plotter is disclosed in which an exchange of writing instruments is achieved automatically between a desired pen holder portion of a stocker carrousel and a pen holder of a drawing head by causing the drawing head to approach or separate relative to the stocker carrousel which is connected to a rotary drive device that holds a number of detachable writing instruments. This automatic lead supplying device for a plotter is provided with a lead supplying device proper, opposed to the stocker carrousel and disposed shiftably, to approach or separate relative to the stocker carrousel. A pen holder is mounted on the lead supplying device which is opposed to the stocker carrousel. Furthermore, a lead tank is provided on the lead supplying device which is positioned in the upper part of the pen holder. In the bottom portion of the lead tank, a chuck mechanism is provided which opens a lead-dropping passage by a lifting force and closes the lead-dropping passage when the lifting force is released. Also, a lifting means for opening/closing the chuck mechanism is disposed on the lead supplying device which is connected to a lifting drive device.

2. Description of the Prior Art

The conventional device has such a drawback that its lead tank is not of rotary type and only one kind of lead can be supplied to the pencil of a stocker carrousel.

SUMMARY OF THE INVENTION

An object of this invention is to eliminate the foregoing drawback by supplying the desired kind of writing lead to the pencil-holder which is retained by the writing instruments stocker.

In order to achieve the foregoing object, this invention provides that a swivelling member is supported on the machine body of a plotter to swivel freely between two desired positions. A loader shaft is journalled on the swivelling member which is interlocked with the rotary drive device. When the swivelling member moves to a predetermined lead supplying position, a lead tank stocker having a number of lead tanks on its circumference, and being connected to the loader shaft, moves by interlocking with the swivelling member to a condition of holding a desired rotary angle. The lead tank moves immediately above the pencil holder of the writing instruments stocker by the movement of the lead tank stocker. At the point where the lead tank is directly above the pencil holder of the writing instruments stocker, the lead tank opens by a shutter mechanism which moves an opener, a piece of writing lead drops from the lead tank and the writing lead is supplied to an empty pencil holder which is retained by the writing instruments stocker. Since the lead tank stocker is rotatable relative to the swivelling member, a lead tank, storing the desired kind of writing lead chosen from a number of lead tanks, can be rotated to a lead supplying position. Accordingly, this invention provides that the lead tank, chosen from a number of lead tanks, moves directly above the pencil-holder of the writing instruments stocker and supplies the lead to the pencil holder.

This invention provides that several kinds of the lead can be supplied to the pencil holder of the writing instruments stocker because of the rotary type of the lead tank stocker. In addition, cost-saving can be achieved as the drive sources for the swivelling member and the lead tank stocker are derived from a common source.

DETAILED DESCRIPTION OF THE PREFERRED EMBODIMENT

Figure 1:
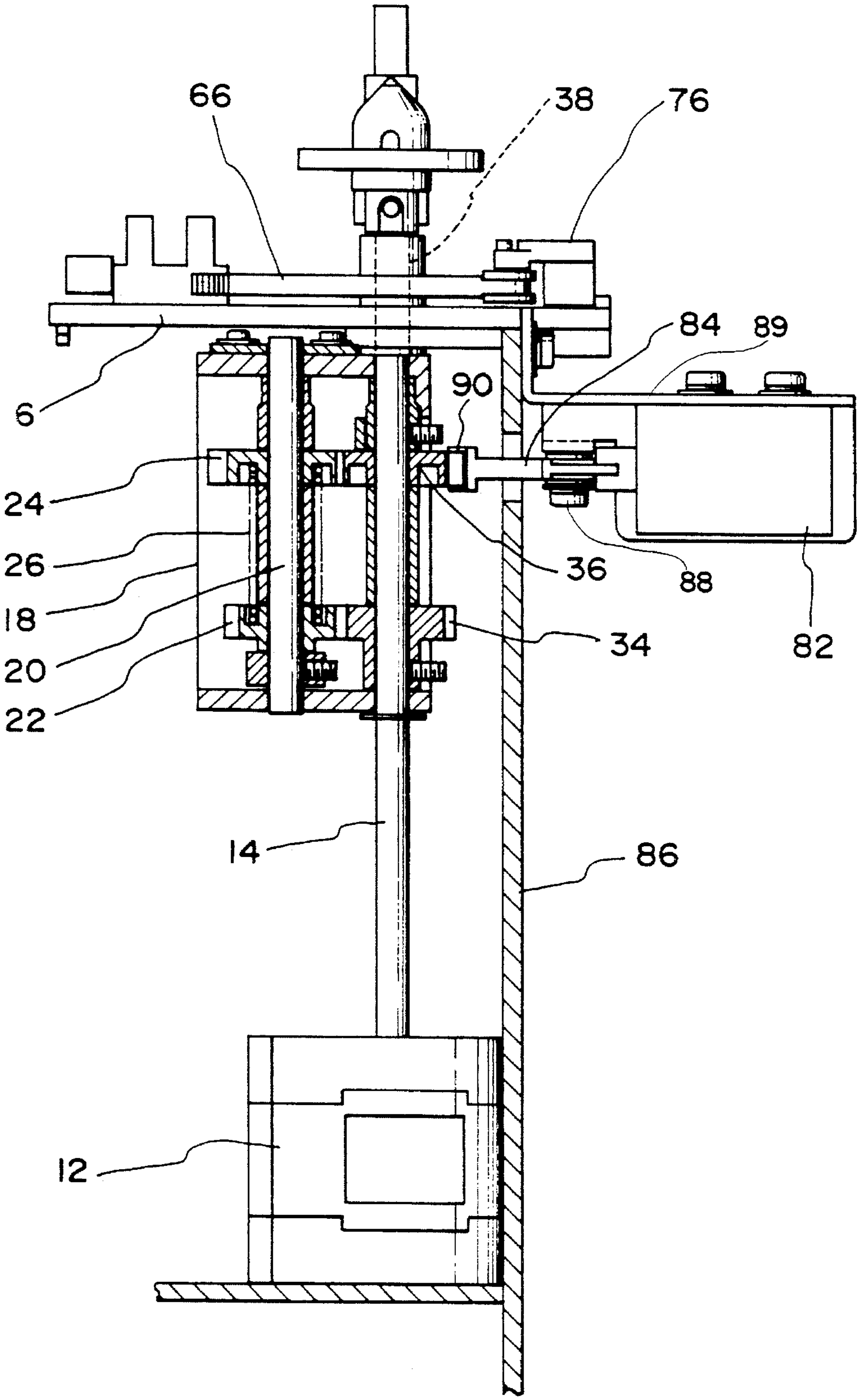
FIG. 1 is a cross section of an automatic lead supplying device embodying this invention.

A construction of this invention is explained in detail in the following by referring to an embodiment shown in the attached drawings. Numeral 2 denotes a base provided on the machine body of a plotter (not shown), and a pulse motor (not shown) which is built into the base. A shaft 4 connected to an output shaft of the motor is projecting on the base 2. A writing instruments stocker 8, which has a holder 6 with a number of writing instruments on its circumference, is detachably connected to the shaft 4. The exchange of a pencil holder 10 is achieved mutually between the desired holder 6 of writing instruments chosen from the holder 6 of a number of writing instruments of the stocker 8 and a drawing line head (not shown).

Figure 6:
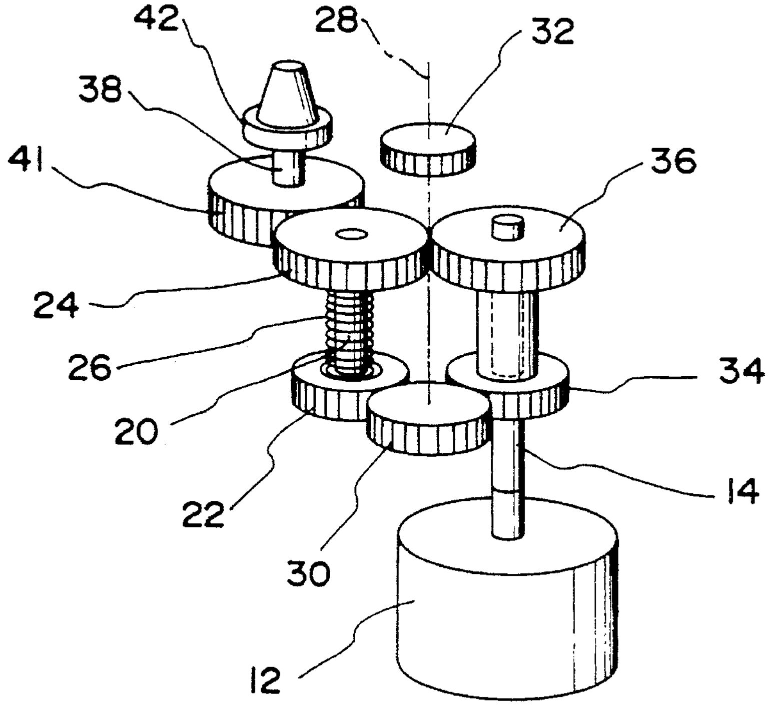
FIG. 6 is an explanatory sketch drawing of the automatic lead supplying device embodying this invention.
Figure 7A:
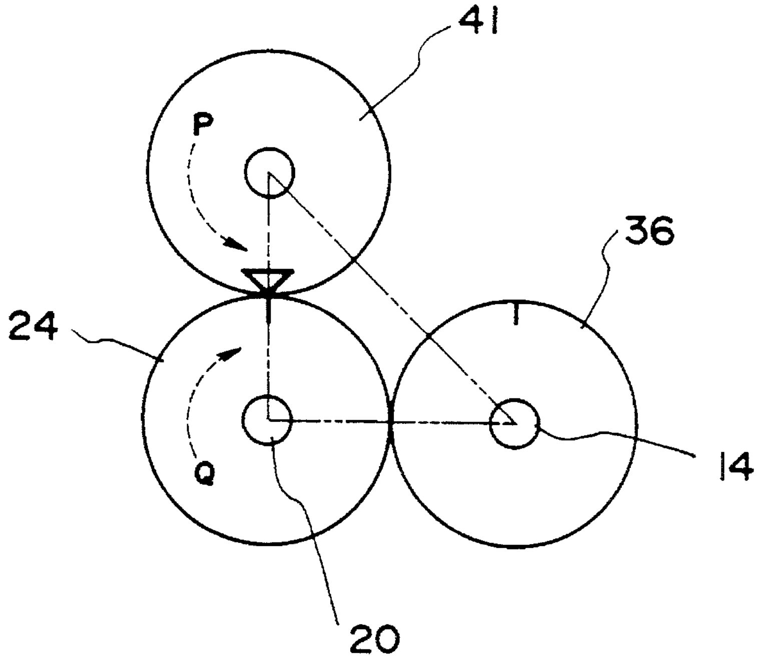
FIG. 7(A) and 7(B) explanatory views of the automatic lead supplying device embodying this invention.
Figure 7B:
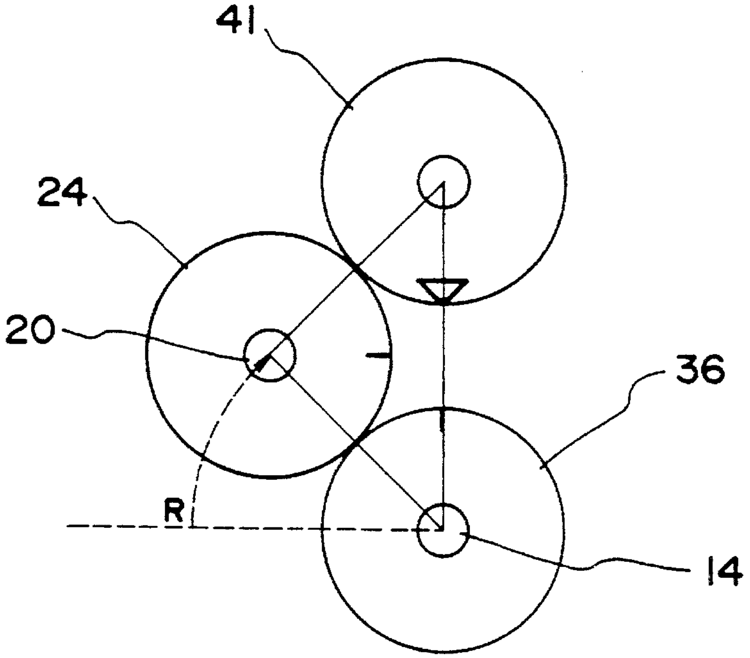

The exchange of the pencil holder 10 is achieved by rotating the stocker 8 to direct the desired holder 6 0f writing instruments opposite the drawing line head. Next, the drawing line head performs a reciprocating motion of approaching and separating relative to the holder 6 of writing instruments of the opposed writing instruments stocker 8. Numeral 12 denotes a pulse motor fixed to the base 2, and a rotary drive shaft 14 is connected to an output shaft of the pulse motor. The upper portion of the rotary drive shaft 14 is rotatably journalled on a horizontal mounting plate 16 affixed to the base 2. Numeral 18 denotes a swivelling unit which is a gear box, and the swivelling unit is rotatably journalled on the rotary drive shaft 14. Gears 22 and 24 are rotatably journalled on a shaft 20 affixed to the swivelling unit 18 (see FIGS. 7 and 6). Between the gears 22 and 24, a torque-limiting spring 26 is placed, and the rotation or the torque of the gear 22 is transmitted to the gear 24 by the resilient force of the spring 26. A shaft 28 is rotatably journalled on the swivelling unit 18, and a transmission gear 30 and an opening/closing shutter gear 32 are affixed to the shaft 28. The transmission gear 30 is meshed with a drive gear 34, which is affixed to the rotary drive shaft 14, and the gear 22.

Figure 5:
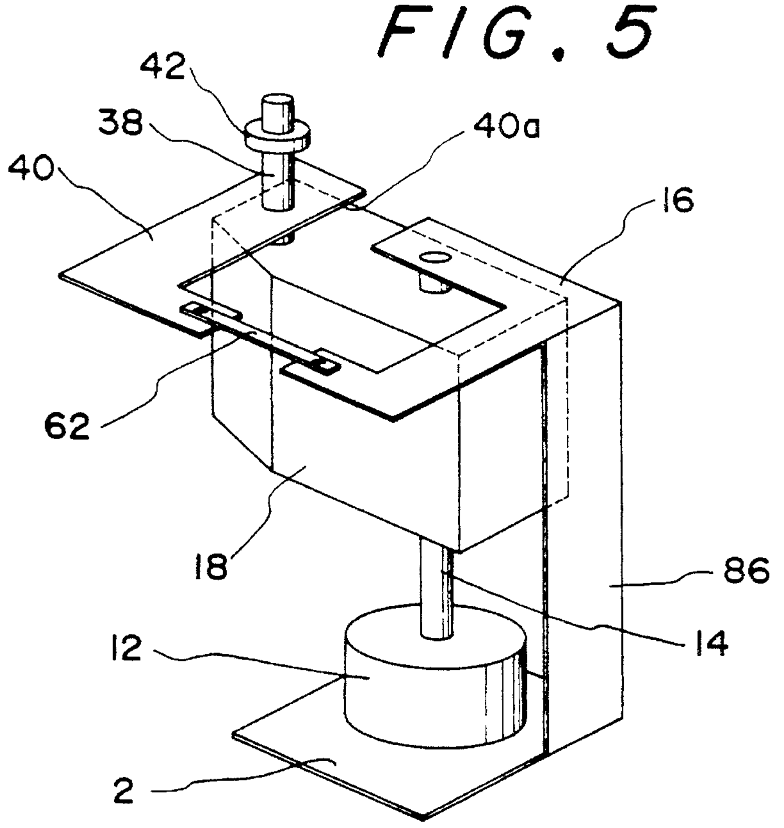
FIG. 5 is an explanatory sketch drawing of the automatic lead supplying device embodying this invention.
Figure 8:
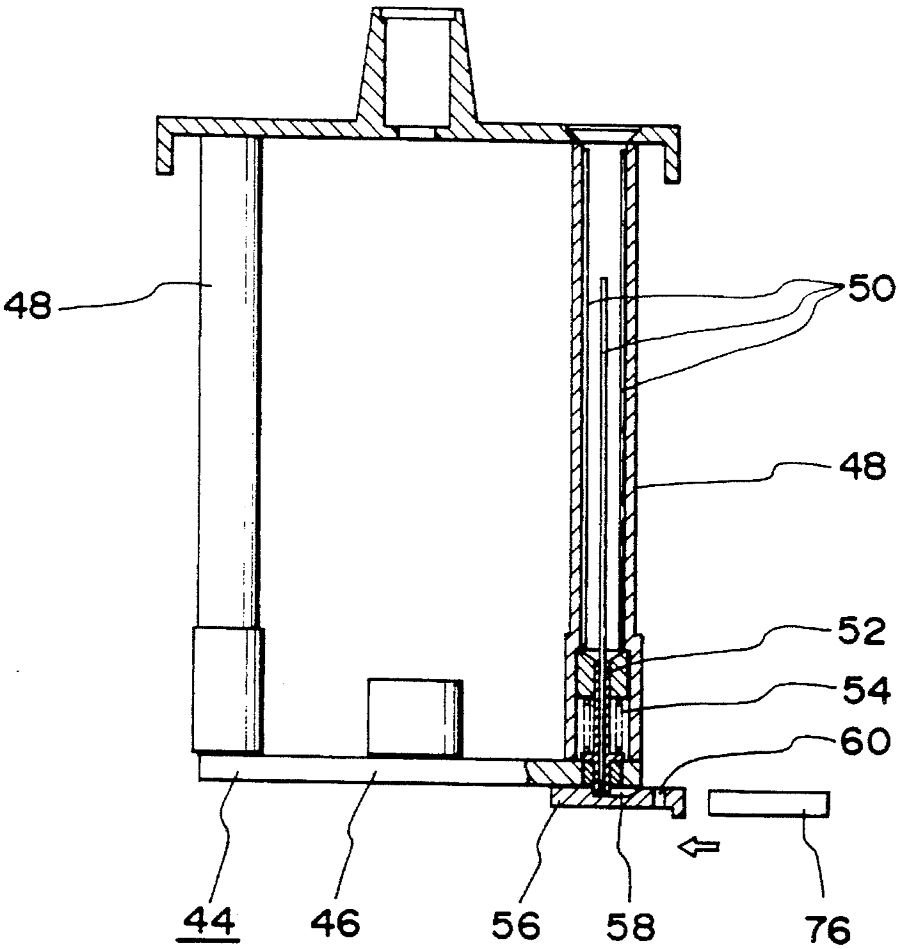
FIG. 8 is a cross section of a lead tank stocker.

A changeover gear 36 is rotatably journalled on the rotary drive shaft 14 (see FIGS. 1, 2 and 6), and the changeover gear 36 is meshed with the gear 24. A loader shaft 38 is rotatably journalled on an end wall of the swivelling unit 18. The gear 41, affixed to the loader shaft 38, is meshed with the gear 24. The loader shaft 38 projects in the upper part from the roof of the swivelling unit 18, and is rotatably inserted into a hole in a transfer plate 40 which is disposed on the swivelling unit 18 (see FIG. 5). The loader shaft 38 projects above the surface of the transfer plate 40 and a tip of the loader shaft 38 is affixed to a connecting member 42. A lower disc 46 of a lead tank stocker 44 is detachably connected to the connecting member 42. The stocker 44 holds a number of lead tanks 48 on a disc 46. A lead-storing unit for storing a number of writing leads 50 is formed on the lead tank 48 as shown in FIG. 8. A hole is formed on the bottom portion of the lead-storing unit, and a pipe-like lead guide 52 is slidably inserted into the hole. The lead guide 52 is positioned in the center of a taper surface for guiding lead found on the bottom portion of the lead-storing unit.

Figure 9:
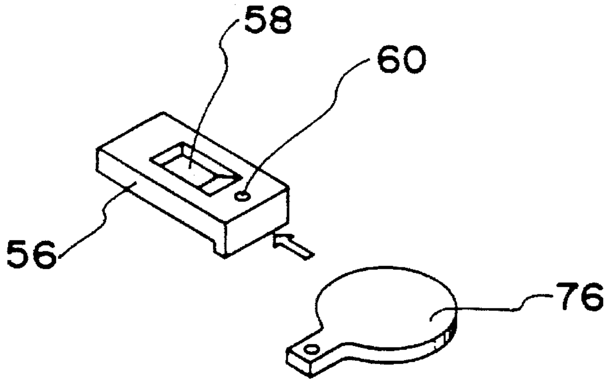
FIG. 9 is a sketch explanatory view of a shutter mechanism.

The lower surface of a flange portion on which the lead guide 52 is formed is in resilient contact with the upper surface of the disc 46 by the resilient force of a compression coil spring 54, and in this resilient contact condition, the lower portion of the lead guide 52 projects by a predetermined amount over the lower surface of the disc 46. The upper end of the lead guide 52 is set at a level of height identical with the tapered bottom surface of the lead-storing unit as shown in FIG. 8. A shutter plate 56 is slidably supported for each lead tank 48 in a radial direction of the disc 46 and on the lower surface of the disc 46. The shutter plate 56 is formed with a concave portion 58 having a horizontal bottom portion and an inclined surface as shown in FIG. 9. A projection is formed downwardly at one end of the shutter plate 56, and a hole 60 is formed near at one end. The shutter plate 56 is engaged with a stopper provided on the disc 46 which is energized to the outer circumference of the disc 46. The shutter plate 36 constitutes a shutter mechanism for dropping a piece of lead 50 from the lead tank 48. This shutter mechanism may be of any type such as a chuck system or other variety of constructions and is not particularly limited to the construction shown in the drawing. Both ends of a link member 62 are rotatably connected to the transfer plate 40 and the mounting plate 16.

Figure 2:
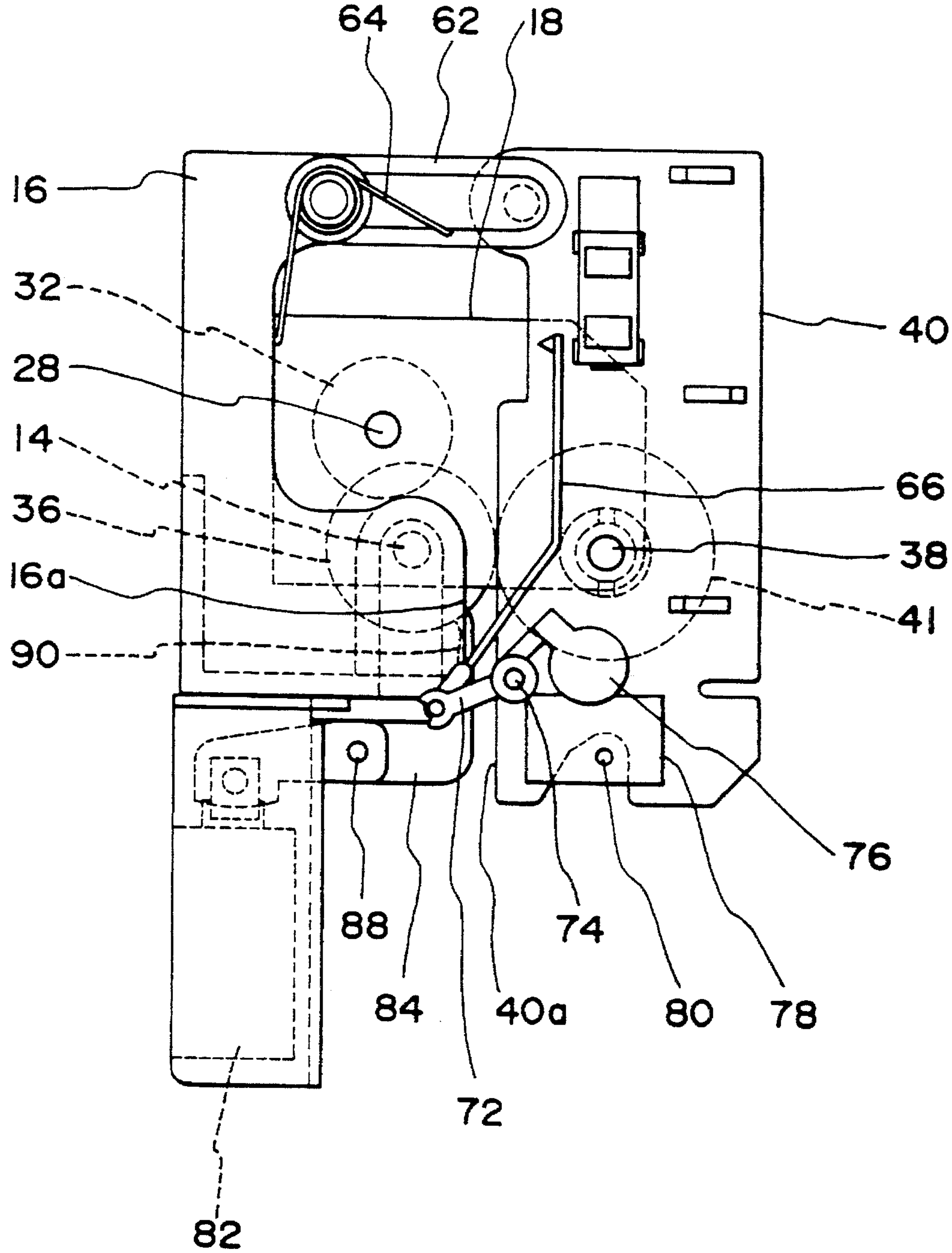
FIG. 2 is a plan of the automatic lead supplying device embodying this invention.
Figure 3:
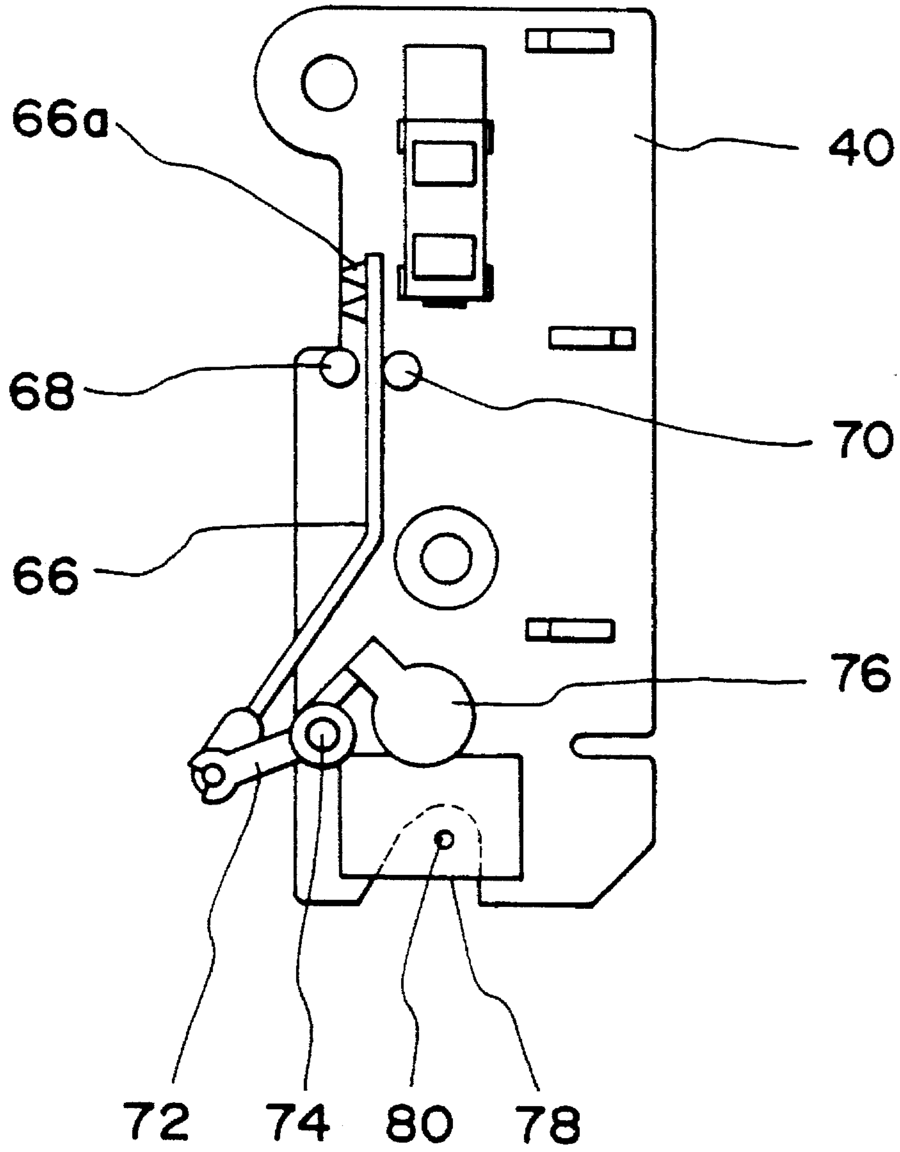
FIG. 3 is a plan of the automatic lead supplying device embodying this invention.
Figure 4:
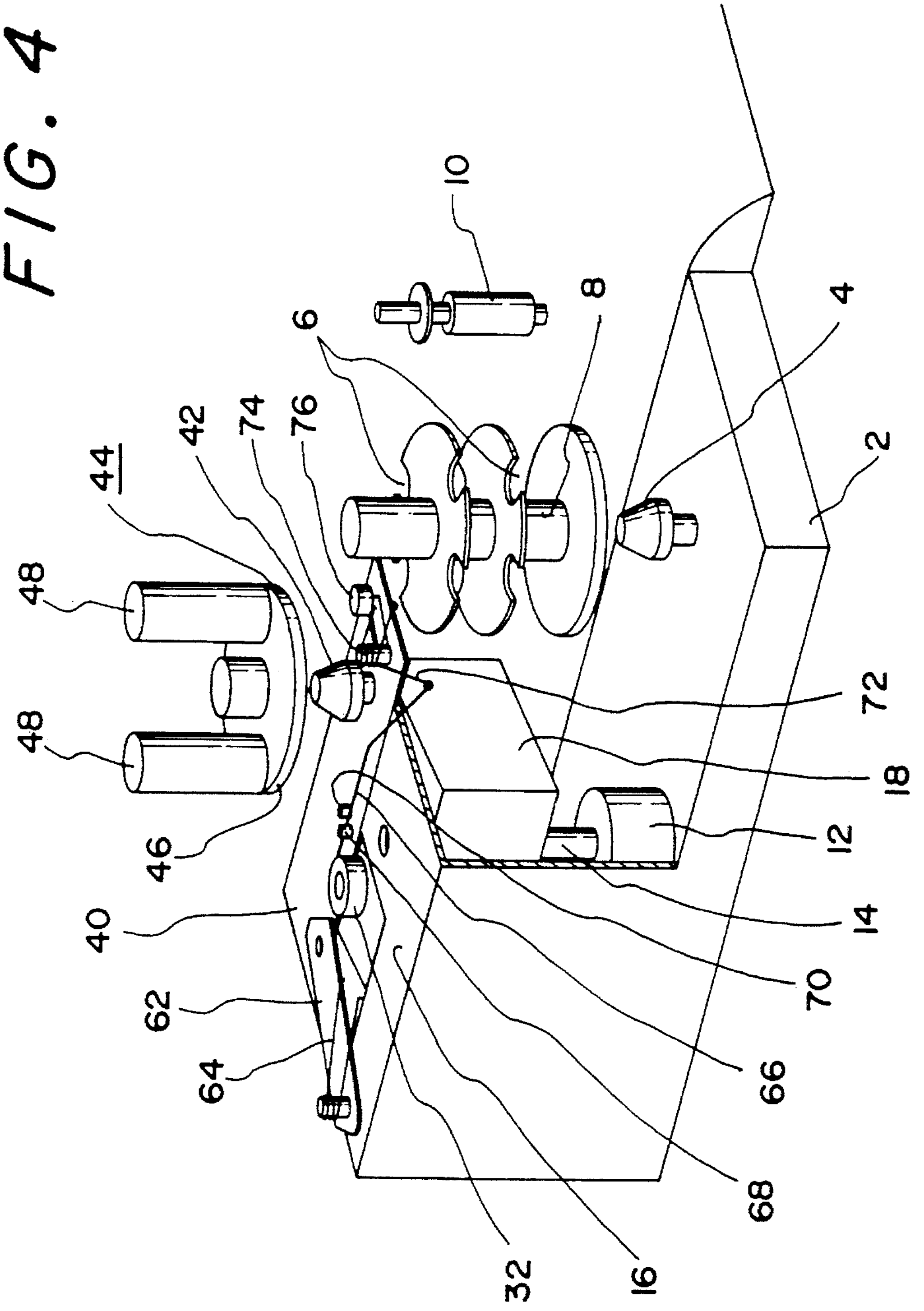
FIG. 4 is a sketch drawing of the automatic lead supplying device embodying this invention.

A return spring 64 is mounted on the link member 62. The return spring 64 energizes the transfer plate 40 in the direction of separating, by a predetermined distance, from a stopper surface 16*a* of the mounting plate 16 to which the stopper surface 40*a* is opposed. Numeral 66 denotes an L-shaped refracting rod, and a rack gear 66*a* is formed on its side portion. The movement of the rod 66 in right and left in FIG. 2 is controlled by guiding shafts 68 and 70 projecting on the transfer plate 40 see (FIG. 3). As shown in FIG. 3, numeral 72 denotes a rotary member, rotatably journalled by means of a shaft 74 on the transfer plate 40 at its center, and a shutter opener 76 which is affixed to one part of the rotary member. The other end of the rotary member 72 is rotatably connected to the rod 66. A lead sensor 78 is affixed to the transfer plate 40, and a lead-drop opening 80 of the lead sensor 78 placed over a notched portion formed on the transfer plate 40. The rotary member 72 is energized in the direction where the shutter opener 76 retreats from the lead drop opening 80 by the return spring. Numeral 82 denotes a solenoid which is affixed to a perpendicular mounting plate 86, and one end of the lock member 84 is rotatably connected to its output shaft. The middle portion of the lock member 84 is journalled on the mounting plate 86 by means of a shaft 88, and lock teeth 90 at the tip of the lock member 84, which is opposite the changeover gear 36.

The operation of this embodiment will be described in the following.

In the case where the lead is supplied to the desired pencil holder 10 from a number of the pencil holders 10 which are retained by the writing instruments stocker 8, firstly, the writing instruments stocker 8 is rotated by the power of the motor, and the desired pencil holder 10 is positioned at a predetermined lead supplying position opposite the swivelling unit 18. In addition, in the condition where the changeover gear 36 is in free rotation relative to the drive shaft 14, the pulse motor 12 is driven to rotate the lead tank stocker 44 and the desired lead tank 48 is positioned at the desired lead supplying position on the transfer plate 40. The lead tank 48 selected in this condition is positioned immediately above the lead-drop opening 80.

In the foregoing condition, the transfer plate 40 is driven in the direction of the writing instruments stocker 8 moving the selected lead tank 48 immediately above the selected writing instruments holder 6 which is chosen by the writing instruments stocker 8. The movement of the transfer plate 40 is achieved by driving the pulse motor 12 in the condition where the changeover gear 36 is locked. When the solenoid 82 is energized, the output shaft is attracted and the lock member 84 turns in an anticlockwise direction in FIG. 2 on the shaft 88. By this movement, the lock teeth 90 are engaged with the changeover gear 36 and the changeover gear 36 is locked. In this condition, the pulse motor 12 is driven and the gear 34 turns in a clockwise direction in FIG. 7(A) whereby the gear 24 also rotates along the changeover gear 36 in a clockwise direction Q in FIG. 7(A).

At this time, the gear 41 turns in an anticlockwise direction P according to the rotation of the gear 24. By the foregoing motion, the gears 24 and 41 move in the arrow R direction (see FIG. 7(B)) centering on the drive shaft 14. The swivelling unit 18 swivels by resisting the returning resilient force of the spring 64 centering on the drive shaft 14 in a horizontal direction relative to the base 2 according to the movement. Also, the rotation P of the gear 41 is cancelled out with the rotary movement of the gears 24 and 41, the rotary angle of the gear 41 does not change relative to the base 2, and the gear 41 moves around the changeover gear 36. This movement interlocked with the movement of the transfer plate 40, of the swivelling unit 18, on the drive shaft 14, stops when the stopper surface 40*a* of the transfer plate 40 abuts on the stopper surface 16*a* of the mounting plate 16. In the condition where the transfer plate 40 is stopped, the opening/closing shutter gear 32 abuts on the rack 66*a* of the rod 66 and the gear 32 meshes with the rack 66*a*. Also, the lead-drop opening 80 is positioned immediately above the selected writing instruments holder 6 chosen by the writing instruments stocker.

In this condition, the lead-inserting hole that opens at the upper end of the pencil holder 10, which is retained by the selected writing instruments holder 6, and the center of the lead-drop opening 80, coincide with the coaxial perpendicular line.

The operation of opening the shutter mechanism of the selected lead tank 48 and dropping and inserting a piece of lead from this tank 48 into the lead-inserting hole of the pencil holder 10, which is retained by the writing instruments stocker 8, will be described in the following.

When the swivelling unit 18 is engaged on the stopper surface 16*a* and its rotation is stopped, and when the pulse motor 42 is driven, the rotation of the gear 42 stops, the rotation of the rotary drive shaft 14 by the power of the pulse motor 12 is transmitted to the opening/closing shutter gear 32 through the gear 34, the transmission gear 30, and the shaft 28, and the opening/closing shutter gear 32 is rotated.

The rod 66 moves by resisting the resilient force of the return spring in the upper direction in FIG. 2 by the rotation of the gear 32, and the rotary member 72 swivels in a clockwise direction on the shaft 74. The opener 76 pushes the shutter plate 56 by the swivelling motion of the rotary member 72. By this pushing motion, the shutter hole 60 lines up with the lead guide 52, and the lead 50 in the lead guide 52 drops through the shutter hole 60. This lead 50 drops and inserts into the lead inserting hole of the pencil holder 10 through the lead-drop opening 80 disposed above the inserting hole. When the power of the pulse motor 12 is released and the swivelling unit 18 is in a free rotating condition relative to the drive shaft 14, the swivelling unit 18 returns to the original position by the return force of the spring 64. The transfer plate 40 then retreats relative to the lead tank stocker 8. Also, the rod 66 returns to its original position by the return force of the spring. In the return condition, it becomes possible to pull out the lead tank stocker 8 from the shaft 4 in the perpendicular direction. Also, it becomes possible to mount the lead tank stocker 8 on the shaft 4 in the perpendicular direction.

What is claimed is:

1. An automatic lead-supplying device for a plotter comprising:

a machine body;

a first rotary drive device disposed on the machine body and having an output shaft;

a writing instruments stocker (8) rotatably disposed about a first axis and having a plurality of holders (6) for detachably holding a plurality of pencil holders (10), respectively, and being connected detachably to the output shaft of the first rotary drive device at the machine body;

a swivelling unit (18) supported on the machine body to swivel between two predetermined positions;

a second drive device (12) having a rotary drive shaft (14) on which the swivelling unit (18) is journalled for driving the swivelling unit (18) so as to swivel between the two predetermined positions;

a loader shaft (38) rotatably journalled on the swivelling unit (18) and being interlocked with the rotary drive shaft (14) of the second drive device (12) and which approaches the writing instruments stocker (8) when the swivelling unit (18) swivels to one of the two predetermined positions and retreats from the writing instruments stocker (8) when the swivelling unit (18) swivels to another of the two predetermined positions;

a means for holding a rotary angle of the loader shaft (38) at a predetermined angle during swivelling of the swivelling unit (18) between the two predetermined positions;

a lead tank stocker (44) rotatably disposed about a second axis which is offset from the first axis and having a circumference with a plurality of lead tanks disposed on the circumference and being connected to the loader shaft (38);

a shutter mechanism, disposed under each of the lead tanks (48), for opening and closing a lower part of a corresponding one of the lead tanks (48) when the shutter mechanism is opened and closed, respectively; and a shutter-driving means for opening and closing the shutter mechanism, said shutter-driving means being interlocked with the rotary drive shaft (14) of the second drive device (12).

2. The automatic lead-supplying device for a plotter according to claim 1, wherein the writing instruments stocker (8) and the lead tank stocker (44) are independently driven by the first rotary drive device at the machine body and the second drive device (12), respectively, and the writing instruments stocker (8) and the lead tank stocker (44) are detachable from the first rotary drive device at the machine body and the second drive device (12), respectively.

* * * * *